United States Patent
Eggers et al.

(10) Patent No.: US 7,441,808 B2
(45) Date of Patent: Oct. 28, 2008

(54) STEERING COLUMN ASSEMBLY COMPRISING A STEERING COLUMN THE TILT AND LENGTH OF WHICH CAN BE MODIFIED

(75) Inventors: Fred Eggers, Buxtehude (DE); Marcel Erang, Wilstedt (DE); Torsten Harms, Hamburg (DE); Holger Kittler, Hamburg (DE); Sven Sagner, Hamburg (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 10/571,179

(22) PCT Filed: Aug. 12, 2004

(86) PCT No.: PCT/EP2004/009029

§ 371 (c)(1),
(2), (4) Date: Jan. 18, 2007

(87) PCT Pub. No.: WO2005/028279

PCT Pub. Date: Mar. 31, 2005

(65) Prior Publication Data

US 2007/0108754 A1    May 17, 2007

(30) Foreign Application Priority Data

Sep. 10, 2003  (DE) .............................. 103 41 704

(51) Int. Cl.
*B60D 1/00* (2006.01)

(52) U.S. Cl. ......................................... 280/777; 74/492

(58) Field of Classification Search ................. 280/775, 280/777; 74/492, 493; 188/371, 372
See application file for complete search history.

(56) References Cited

U.S. PATENT DOCUMENTS

| 4,142,423 | A  |   | 3/1979  | Ikawa |
|-----------|----|---|---------|-------|
| 4,901,592 | A  | * | 2/1990  | Ito et al. ........................ 74/492 |
| 5,286,056 | A  |   | 2/1994  | Speich |
| 5,788,278 | A  | * | 8/1998  | Thomas et al. ............... 280/777 |
| 6,189,929 | B1 | * | 2/2001  | Struble et al. ................ 280/777 |
| 6,224,104 | B1 |   | 5/2001  | Hibino |
| 6,264,240 | B1 | * | 7/2001  | Hancock ....................... 280/777 |
| 6,478,333 | B1 | * | 11/2002 | Barton et al. ................ 280/777 |
| 6,655,716 | B2 | * | 12/2003 | Riefe ........................... 280/777 |

FOREIGN PATENT DOCUMENTS

| DE | 37 20 320    A1 | 12/1988 |
| DE | 694 01 587   T2 | 8/1997  |
| DE | 699 01 366   T2 | 11/2002 |
| EP | 0 802 104    A1 | 10/1997 |

\* cited by examiner

*Primary Examiner*—Kevin Hurley
*Assistant Examiner*—Robert A. Coker
(74) *Attorney, Agent, or Firm*—Crowell & Moring LLP

(57) ABSTRACT

A steering column assembly has a bracket situated fixed on a vehicle, and a rotatable steering column, which has a column jacket and a steering shaft mounted therein. The steering column has modifiable tilt and length and a clamping mechanism for fixing the steering column. The steering column is connected via a bracket slide to a bracket. The bracket slide is displaceably mounted on the bracket, and an energy absorbing element is situated to absorb energy during a displacement of the bracket slide in relation to the bracket.

8 Claims, 3 Drawing Sheets

STEERING COLUMN ASSEMBLY COMPRISING A STEERING COLUMN THE TILT AND LENGTH OF WHICH CAN BE MODIFIED

BACKGROUND AND SUMMARY OF THE INVENTION

The present invention relates to a steering column assembly.

In modern vehicle construction, steering columns are implemented so that their tilt and length may be modified for comfort purposes. They may thus be set to the individual requirements of a driver. Clamping means are provided for fixing the steering column in its position. These are constructed in such a way that they block the modifiability of the position of the steering column reliably and permanently. This applies in particular for the case in which a force acting in the axial direction engages on the steering column, as in the event of an accident, for example.

In addition, the clamping means must be designed to permit, if necessary, an easy modification of the position of the steering column. A steering column of this type is known, for example, from EP 0 802 104 A1. That steering column has a bracket fixed on the vehicle, on which the clamping means are mounted in the form of lamellae. The steering column is connected to a bracket fixed to the vehicle via these clamping means. In an open position of the clamping means, the steering column can be displaced in relation to the bracket. In a closed position of the clamping means, the steering column is fixed in relation to the bracket.

In order to design steering column assemblies safely for a vehicle impact, attaching a steering column whose position is not adjustable to a bracket situated fixed to the vehicle so that, in case of an accident, an axial displacement of the steering column in relation to the bracket is made possible with energy absorption, is known. For this purpose, for example, reference is made to DE 37 20 320 A1 disclosing a steering column assembly having a bracket situated fixed on the vehicle. Furthermore, also described is a nonadjustable steering column, which is connected via a clip to the bracket. Clip and bracket are connected to one another via bolts. The bolts engage in oblong holes introduced into the clip, which allow displacement of the clip in relation to the bracket while absorbing energy in case of an accident. How the clip is fixed in relation to the bracket during normal use of the steering column assembly is not described.

A steering column assembly for motor vehicles which forms the species is disclosed in EP 0 949 136 B1.

An object of the present invention is to provide a steering column assembly in which, while maintaining known comfort functions, the safety of vehicle passengers is increased and reliable use of the steering column assembly is ensured.

This object has been achieved according to the present invention by a steering column assembly in which the energy absorbing element is guided along the bracket, or on a deformation element on the bracket during displacement, and is deformed at the same time.

The foregoing object has been achieved according to the present invention by a steering column assembly having a bracket situated fixed on the vehicle, and a steering column which is implemented so its tilt and length may be modified for comfort reasons. In addition, a clamping mechanism is provided for fixing the steering column in its position. In order to increase the safety of vehicle passengers in case of a crash, a bracket slide is provided between the bracket situated fixed on the vehicle and the steering column having the clamping mechanism, which is connected to the bracket, so that a linear displacement of the bracket slide along the bracket is possible. Furthermore, an energy absorbing element is provided, which is situated to absorb energy in the event of a displacement of the bracket slide in relation to the bracket. Thereby, the safety of vehicle passengers is increased in the event of an accident, because, in addition to displacement of the steering column, impact energy is additionally absorbed.

The steering column assembly according to the present invention particularly has the advantage that the bracket receives the bracket slide and all functional elements of the clamping mechanism and therefore is insensitive to external influences, such as, for example, tolerances in the mounting and the vehicle body support structure to which the bracket is attached. These tolerances therefore have no influence on the crash function.

In the steering column assembly according to the present invention, the energy absorption occurs on the basis of deformation work of the energy absorbing element. Energy absorption via deformation work is well-known in the field of automobile technology from other areas. Because of this, simple implementation is possible, since the experience of other fields may be used.

The energy absorbing element may be implemented as, for example, a wire. Other forms are also contemplated, such as a sheet-metal strip.

Energy absorption may occur via an energy absorbing element if two parts are moved in relation to one another. According to a first embodiment variation, the bracket slide engages on the wire during its displacement and carries the wire along. If the wire is guided along and deformed on a further object, such as the bracket, at the same time, energy may be absorbed in a simple way. It is contemplated to situate a reforming element on the bracket for this purpose.

According to a further embodiment of the present invention, the energy absorption only occurs after the bracket slide has already been displaced over a specific path in relation to the bracket. This provides the advantage that the energy level at the instant of the disengagement of the bracket slide from the bracket is minimized, so that no unacceptable load spikes occur for the vehicle passengers.

Other objects, advantages and novel features of the present invention will become apparent from the following detailed description of the invention when considered in conjunction with the accompanying drawings.

DETAILED DESCRIPTION OF THE DRAWINGS

Figure 1:
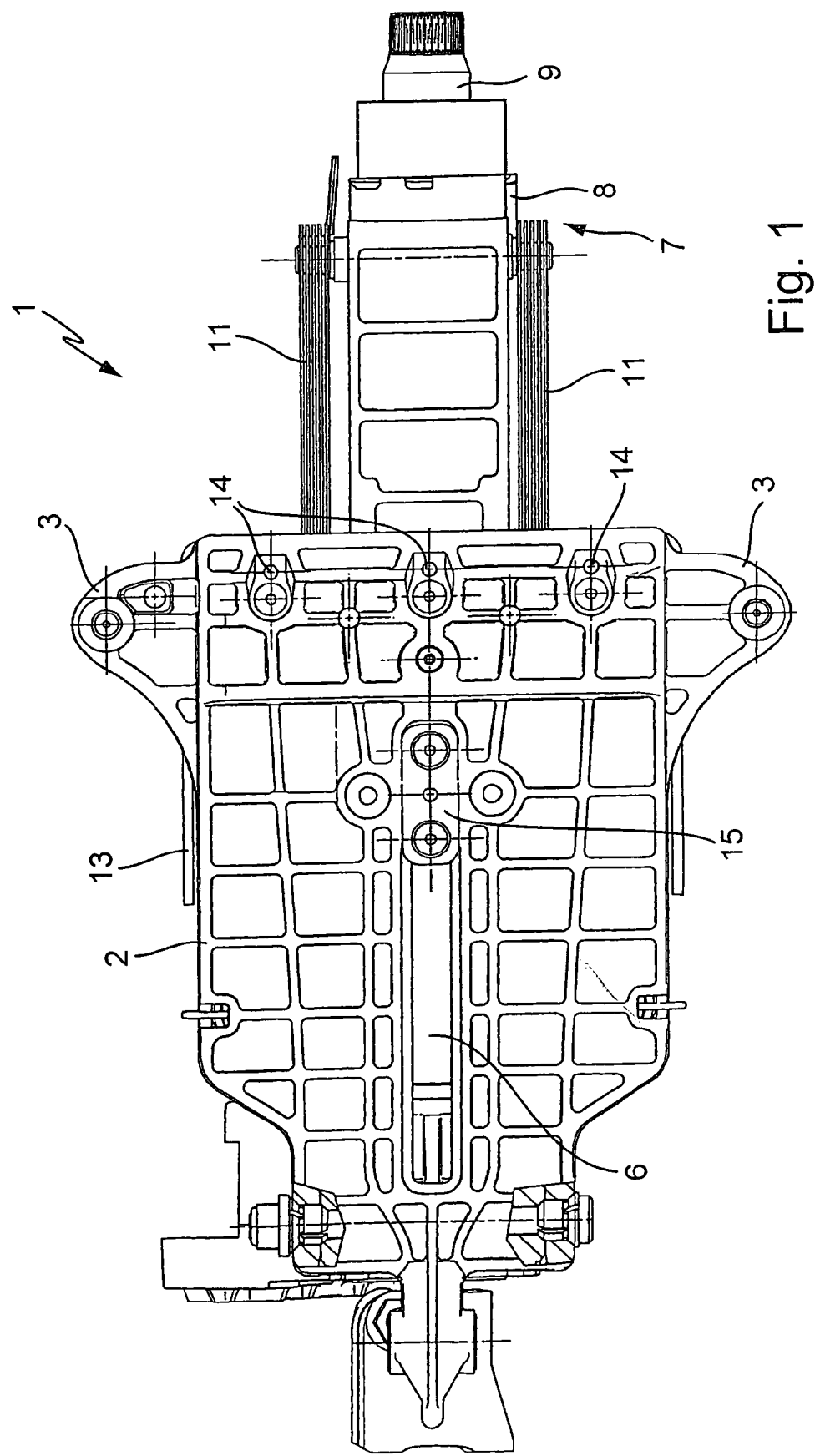
FIG. 1 is a top view of a steering column assembly according to the present invention.
Figure 2:
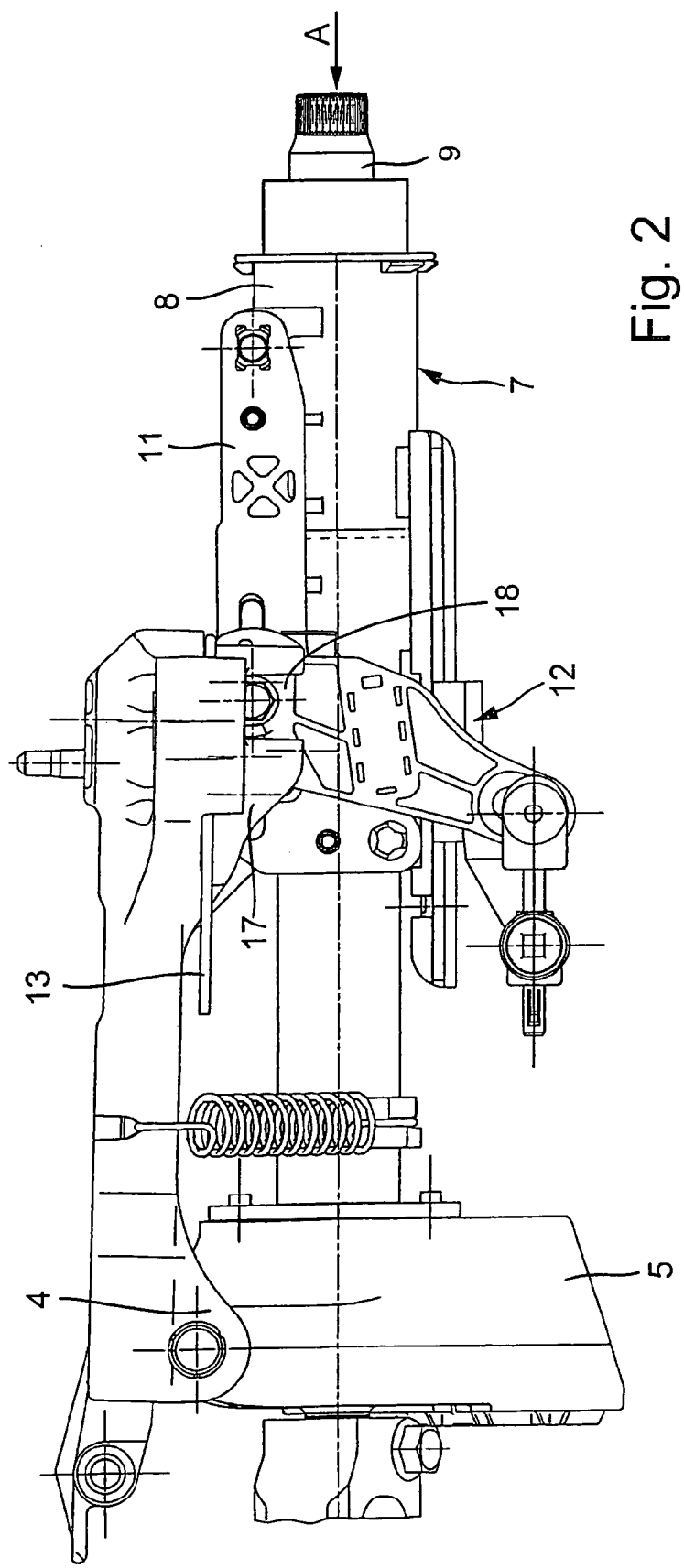
FIG. 2 is a side view of the steering column assembly shown in FIG. 1.

A steering column assembly 1 shown in FIG. 1 has a bracket 2 that has an essentially rectangular cross-section and receptacles 3 for fasteners (not shown in greater detail). The bracket 2 is mounted on a vehicle (also not shown) via these fasteners. Furthermore, receptacles 4 are provided (see FIG. 2), which are used for receiving a further fastener. The fastener situated in the receptacles 4 is used for attaching a sleeve 5. Furthermore, the bracket 2 has an oblong hole 6 which extends over a majority of the length of the bracket 2.

The steering column assembly 1 also has a steering column 7 having a column jacket 8 and a steering shaft 9 mounted in the column jacket 8 so as to be rotatable. The steering shaft 9 is used for receiving a steering wheel (not shown) and transmitting a rotational movement introduced by a driver into the steering wheel to a steering gear.

In addition, lamellae packets 11 may be seen situated on both sides of the column jacket 8, as seen in FIG. 1, via which the steering column may be fixed in a specific position. The lamellae packets 11 work together with a known clamping device 12 which is known from the prior art. Fixing or loosening the clamping device may be performed by increasing or reducing the pressure existing between the lamellae 11, and the steering column may thus be adjusted or fixed.

A bracket slide 13 is situated below the bracket 2. The bracket slide 13 is connected via fasteners 14 and a slide block 15 to the bracket. The slide block 15 has its dimensions tailored to the dimensions of the oblong hole 6 and is situated therein. The slide block 15 is connected via suitable fasteners, such as screws 16, to the bracket slide 13. As may be seen from FIG. 2, the clamping device 12 is situated on the bracket slide 13. For this purpose, the bracket slide 13 has a leg 17 situated at an angle thereto. The leg 17 has receptacles 18 (one of which is shown), via which a connection may be produced between the bracket slide 13 and the clamping device 12.

In the following, the mode of operation of the steering column assembly 1 according to the present invention is explained in greater detail in connection with FIGS. 3 and 4. If a force A acts on the steering column assembly 1 as shown by the arrow in case of a crash and this force A exceeds a predetermined amount, the force A is conducted via the steering shaft 9, the column jacket 8, and the clamping device 12 into the bracket slide 13. In this case, the clamping device 12 is configured so it withstands a predetermined force amount, i.e., holds the steering column 7 in its position in spite of this force. If the force A exceeds a predetermined amount, the fasteners 14 between bracket slide 13 and bracket 2 disengage, making a movement of the bracket slide 13 in relation to the bracket 2 possible.

Through the interaction of the slide block 15 connected to the bracket slide 13 and the oblong hole 6 of the bracket 3, the bracket slide 13 performs a defined linear movement, which is predefined by the oblong hole 6. Accordingly, the steering column assembly 1 according to the present invention provides two possibilities for displacing the steering column 7 in the vehicle. One possibility is provided after loosening of the clamping device 12 for the purpose of comfort adjustment of the steering column 7; a further possibility is provided after disengagement of the fasteners 14 in case of a crash. By providing two separate displacement and/or adjustment possibilities, the resistances which must be overcome upon displacement of the steering column assembly 1 can be set differently.

Figure 3:
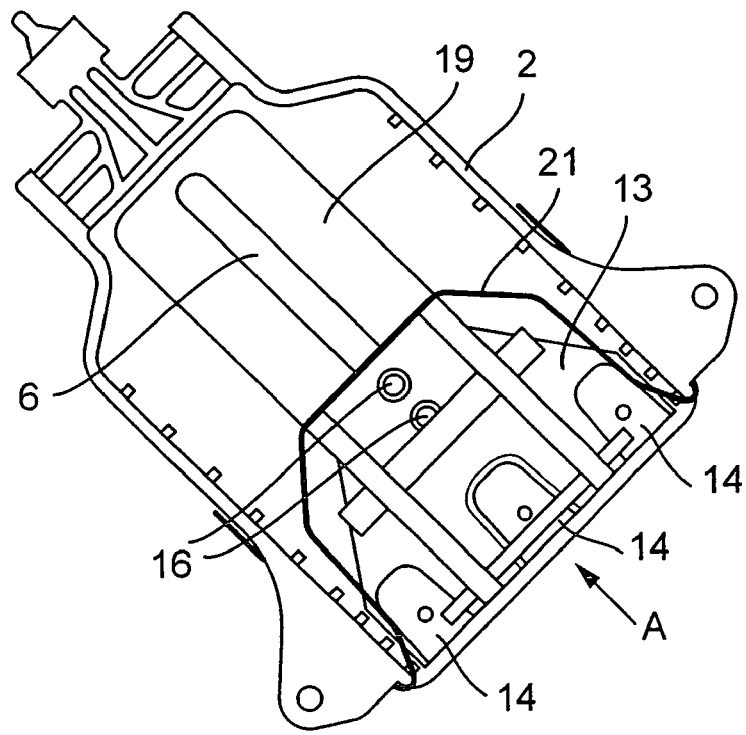
FIG. 3 is a three-dimensional illustration of a bracket having a bracket slide of a steering column assembly and an energy absorbing element of FIG. 1 before an impact.

A bracket 2 having a bracket slide 13 is shown in FIG. 3, before the force A acts on the steering column assembly 1. For the sake of clarity, the steering column 7 connected to the bracket slide 13 and the clamping device 12 are not shown. However, both the fasteners 14 between the bracket slide 13 and the bracket 2 and also the fastener 16 for the slide block 15 (not shown) are shown in FIG. 3. Furthermore, the oblong hole 6 in the bracket 2, through which the slide block 15 is guided, is shown.

A crash wire 21 is guided around the bracket slide 13. In its most distant position, this wire assumes a "W shape" and its more central part is guided around the bracket slide 13 and its two ends each run to the other side of and are guided around the bracket 2. The crash wire 21 does not press against the bracket slide 13 all around, but rather is guided around it with play. A first movement of the bracket slide 13 in relation to the bracket 2 is thus possible without deforming the wire 21 and therefore without additional resistance. A force spike when the fasteners 14 between bracket 2 and bracket slide 13 disengage is thus reduced.

Figure 4:
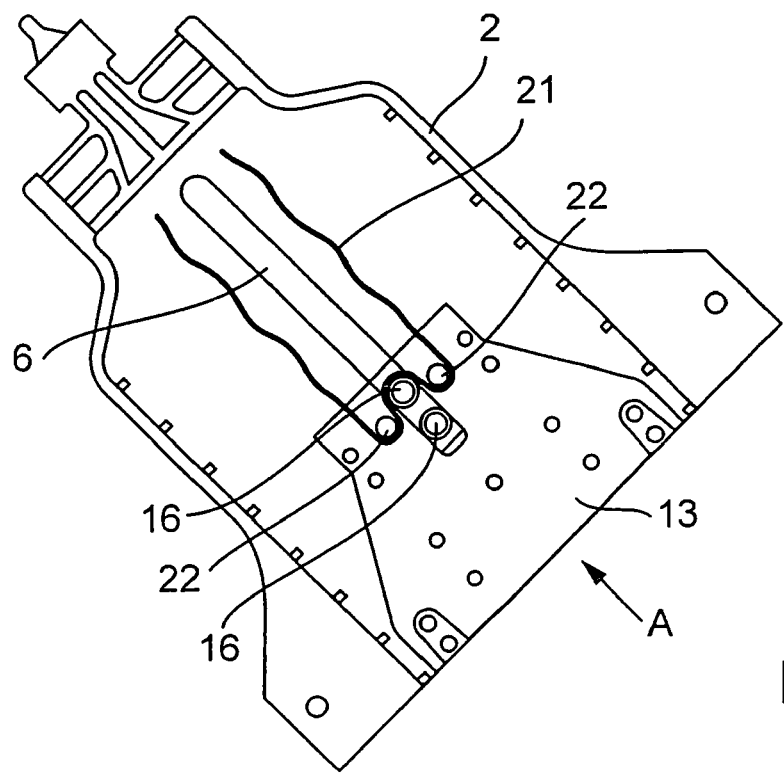
FIG. 4 is a three-dimensional illustration of a further embodiment of a bracket having a bracket slide of a steering column assembly and an energy absorbing element of FIG. 1 before an impact.

A further exemplary embodiment of a steering column assembly having an energy absorbing wire is shown in FIG. 4. For the sake of clarity, the bracket slide 13 is shown as transparent. In contrast to the exemplary embodiment shown in FIG. 3, the wire 21 is not guided around the bracket slide 13 and the bracket 2. Rather, two reforming elements 22 provided on the bracket 2 are situated so that they are located on both sides of the fastening structure 16 of the slide block 15 in the starting position shown in FIG. 4. The wire 21 runs between bracket slide 13 and bracket 2 and is guided snaking around both the reforming elements 22 and also around the fasteners 16 situated in the starting position between the reforming elements 22.

If a force A acts on the steering column assembly 1 in case of an accident and this force acts on the bracket slide 13 via the steering shaft 9, the column jacket, and the clamping device 12, the fasteners 14 disengage and release a movement of the bracket slide 13 in relation to the bracket 2. In the embodiment shown in FIG. 3, the bracket slide 13 performs a movement which is predefined by the oblong hole 6. The crash wire 21 is carried along in this case. Deformation of the crash wire 21 with performance of deformation work first occurs at the instant at which the crash wire 21 presses tightly between bracket slide 13 and bracket 2. In the following, the wire 21 is pulled around the bracket 2 and then back and forth at the same time. During this procedure, energy is absorbed. The energy absorption level may be set via the material and the geometry of the wire.

In the embodiment shown in FIG. 4, the wire is carried along by the fastener 16 and/or the slide block 15 during displacement of the slide block 13 in relation to the bracket 2 and guided around the reforming elements 22 at the same time. In accordance with the embodiment described above, the wire 21 is deformed and absorbs energy at the same time. The energy absorption begins in this case directly at the beginning of the movement of the bracket slide 13.

The invention claimed is:

1. A steering column assembly, comprising:
a bracket operatively situated on a vehicle,
a steering column having a column jacket and a steering shaft mounted therein so as to be rotatable, wherein the steering column has modifiable tilt and length and a clamping mechanism for adjustably fixing the steering column, the steering column being operatively connected with the clamping mechanism, via a bracket slide, to the bracket to be displaceable when fasteners between the bracket slide and bracket are disengaged during a crash, an energy absorbing element arranged to absorb energy during a displacement of the bracket slide in relation to the bracket that occurs only after the clamping mechanism has withstood a force of predetermined amount during the crash, the energy absorption resulting from deformation work, wherein the energy absorbing element is guided along the bracket or on a deformation element situated on the bracket during displacement and is simultaneously deformed.

2. The steering column assembly according to claim 1, wherein the energy absorbing element is a wire.

3. The steering column assembly according to claim 2, wherein the bracket slide is configured to engage and carry the wire along during the displacement.

4. The steering column assembly according to claim 1, wherein the energy absorption begins only after the bracket slide has covered a predetermined path.

5. The steering column assembly according to claim 4, wherein the energy absorbing element is a wire.

6. The steering column assembly according to claim 5, wherein the bracket slide is configured to engage and carry the wire along during the displacement.

7. The steering column assembly according to claim 4, wherein the energy absorbing element is a wire guided around the bracket slide in a starting position.

8. The steering column assembly according to claim 4, wherein the energy absorbing element is a wire guided around the bracket slide with play in a starting position.

\* \* \* \* \*